April 1, 1952     P. C. VINCENT     2,591,219
DRIVING UNIT FOR MOTOR VEHICLES

Filed July 11, 1947     3 Sheets-Sheet 1

INVENTOR
PHILIP C. VINCENT

April 1, 1952  P. C. VINCENT  2,591,219
DRIVING UNIT FOR MOTOR VEHICLES
Filed July 11, 1947  3 Sheets-Sheet 3
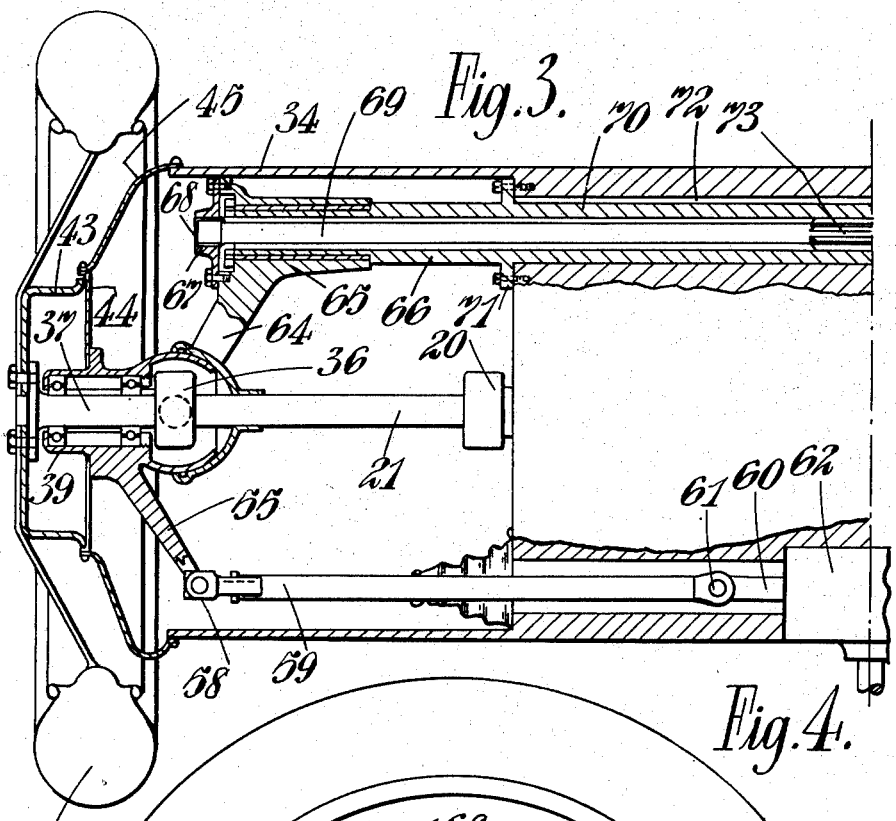
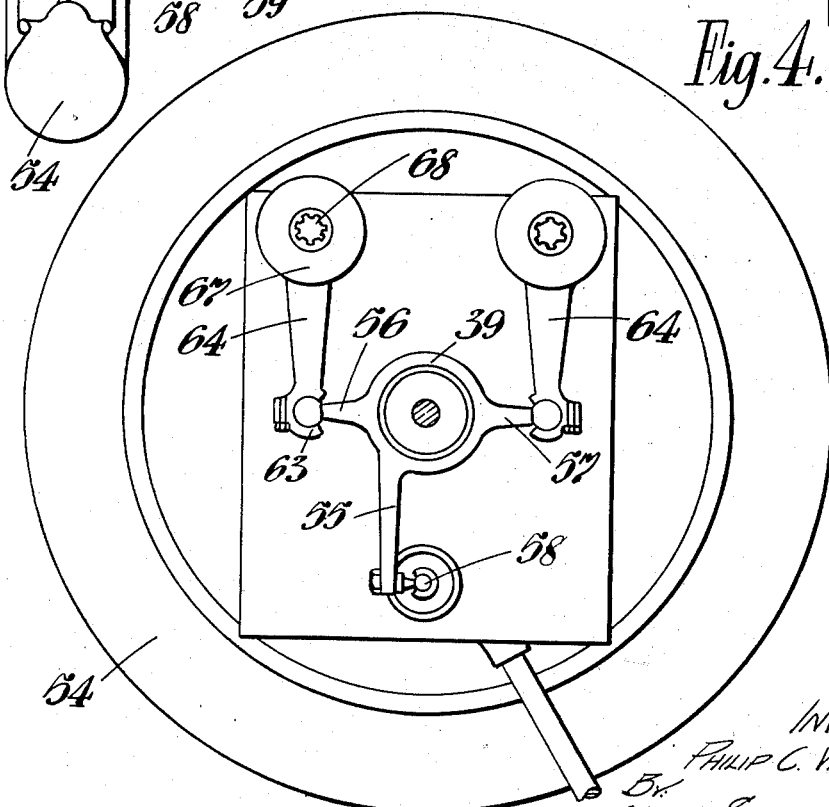
INVENTOR
PHILIP C. VINCENT Patented Apr. 1, 1952

2,591,219

UNITED STATES PATENT OFFICE 2,591,219

DRIVING UNIT FOR MOTOR VEHICLES

Philip Conrad Vincent, Stevenage, England, assignor to Vincent "H. R. D." Company Limited, Stevenage, England, a British company Application July 11, 1947, Serial No. 760,335
In Great Britain November 15, 1943

Section 1, Public Law 690, August 8, 1946
Patent expires November 15, 1963

7 Claims. (Cl. 180—56)

This invention relates to a driving unit for a motor vehicle of the kind in which the engine and axle assemblage are constructed as a self-contained unit with driving gear between the engine and the axle.

According to this invention, a driving unit of the kind referred to comprises an axle casing fixed in relation to the engine, an axle coupled with the driving gear so as to be movable in an up and down direction relatively to the fixed axle casing, guide means in the axle casing which constrain the axle to move in the aforesaid direction, spring means between the axle and a fixed part of the unit, sealing means at the ends of the axle casing so as totally to enclose the axle parts, and anchorages on a fixed part of the unit for attachment to the vehicle chassis.

It will be appreciated that such an arrangement enables an engine axle assemblage to be fitted to almost any chassis, and it is contemplated according to this invention, fitting a number of such units to any single chassis according to the power required, thereby enabling mass-production methods to be employed for a large range of vehicles.

Preferably, the engine is assembled with said unit so that its crankshaft is transverse to the fore-and-aft axis of the vehicle. Furthermore, in order to economise in chassis or body space, the engine cylinders are preferably arranged parallel with the fore-and-aft axis of the vehicle. For the same reason the engine is arranged above the axle assemblage. A suitable engine for this purpose is one as described in prior United States Patent No. 2,347,444 and British Patent No. 567,646.

The aforesaid axle casing may comprise a part of the cooling system of the engine, for example, it may be arranged to support the radiator. In one construction, the radiator may be disposed in a jacket space formed in the wall of the axle casing, and means are provided for feeding water from the engine jacket to one set of passages in the radiator and/or to other passages. In another arrangement, the axle casing may be liquid-tight, and in the case where the engine is liquid-cooled, e. g., oil-cooled, the axle casing may be provided with internal and external cooling fins, the liquid being arranged to circulate over the inner surfaces of the casing and then through the liquid cooling system of the engine.

It will be appreciated that in either arrangement, the axle casing operates as a radiator.

In any of the arrangements referred to above, the axle assemblage may comprise two half-axles coupled through universal joints with a differential gear driven by the engine, and in such an arrangement the axle bearings adjacent the road wheels are mounted on guides at the end of the axle casing so as to move in an up-and-down direction. For example, each half-axle may be driven through two universal joints and a telescopic coupling, from said differential gear, and the outer extremity of the half-axle assemblage is carried by bearings mounted on a slideway at the extremity of the axle casing. In such an arrangement, each axle bearing may be so mounted in the slideway, and the slideway so inclined, that the general plane of the road wheel and the line of sliding lie on opposite sides of a vertical plane so that they intersect at or near the point of contact of the wheel with the road.

Alternatively, each half-axle may be driven through two universal joints and telescopic couplings from said differential gear and a bearing for the outer extremity of the half-axle is carried in a housing mounted on a rocking lever arm or arms, the movement of which is resisted by spring means which lever-arms and spring means are mounted within the axle casing.

The aforesaid spring means between the axle and a fixed part of the unit may be arranged within the axle casing.

The following is a description of two alternative arrangements according to this invention, reference being made to the accompanying drawings, in which:

Figure 3 is a sectional plan view of an alternative construction, and

Figure 4 is a side elevation of the arrangement shown in Figure 3, looking from the left.

Figure 5 is a sectional view of an alternate form of wheel mounting.

Figure 1:
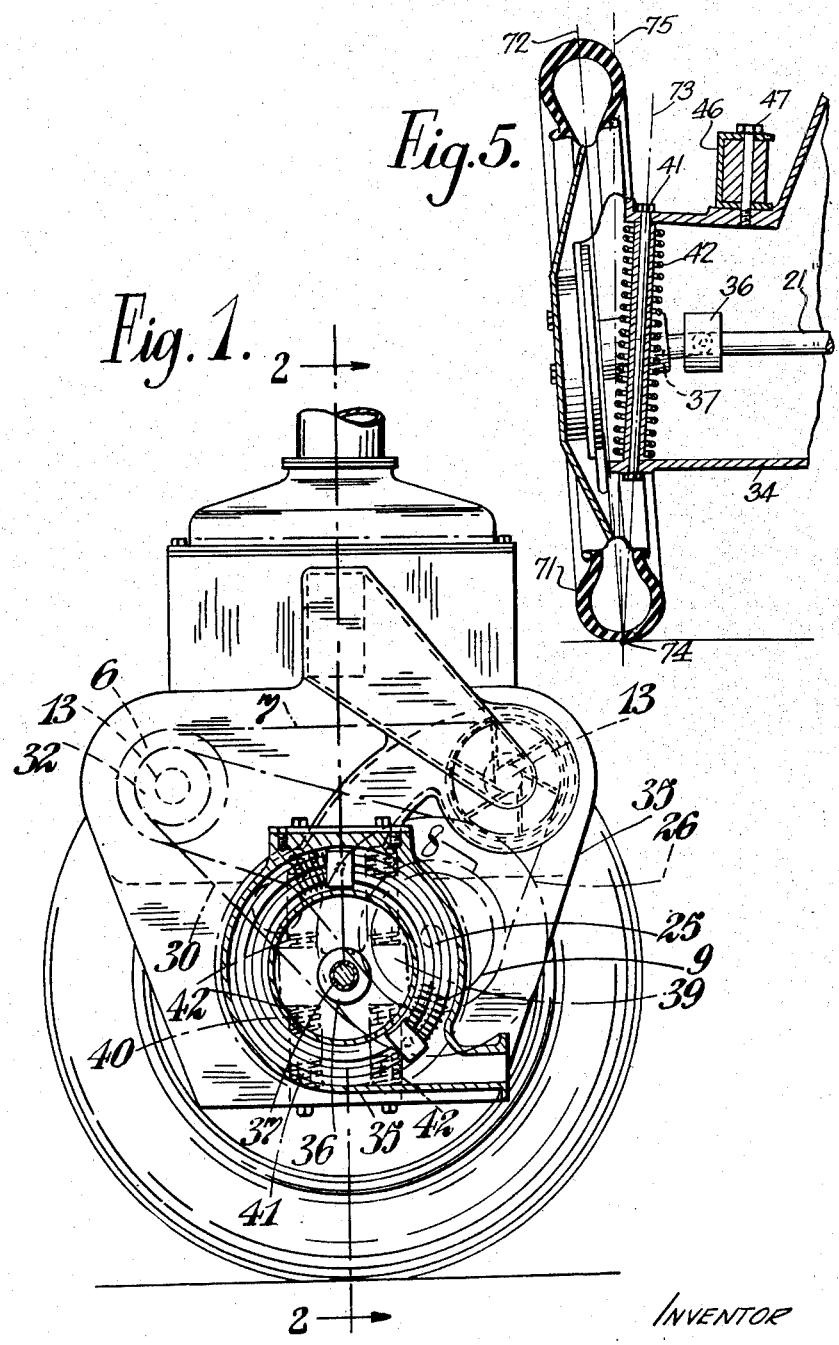
Figure 1 is a side view of an engine axle unit with one of the road-wheels removed.
Figure 2:
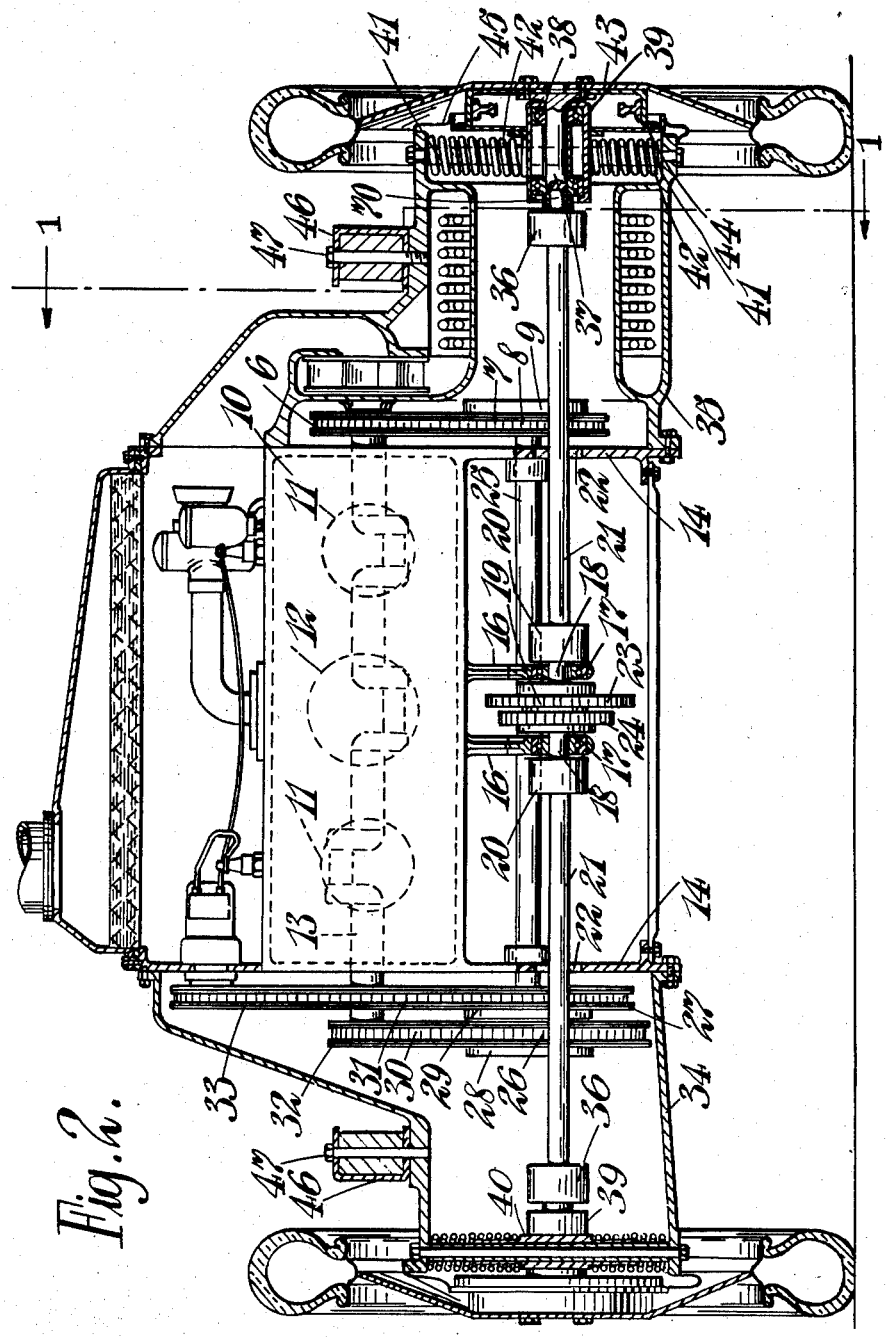
Figure 2 is a section on the line 2—2 of Figure 1.

Referring to the arrangement shown in Figures 1 and 2, the engine employed is similar to that described in prior United States Patent No. 2,347,444 and British No. 567,646, and comprises a cylinder block 10 having two working cylinders 11 arranged with their axes extending in a fore-and-aft direction with respect to the vehicle, and a pump cylinder 12 disposed between them. Two crankshafts 13 are provided, one at either end of the cylinders. Cast integral with the cylinder block are the walls 14 of a differential casing having a removable bottom wall 15. Brackets 16, also cast integral with the cylinder block, carry bearings 17 for short shafts 18 extending on either side of the differential gearbox 19. Each of these short shafts is connected through a universal joint 20 with a half-axle 21, which half-axles extend through suitable openings 22 in the side-walls 14 of the differential casing. The differential gearbox 19 is provided with two gear-wheels 23, 24, of different diameter, which are engaged by suitable sized pinions on a layshaft 25 mounted in bearings carried by the walls 14. Clutches are provided for connecting either of the pinions to the layshaft 25. The left-hand end of the layshaft, as seen in Figure 2, is provided with two sprocket-wheels 26 and 27 connected to it by clutches 28 and 29 and which are driven by chains 30 and 31 respectively from two sprocket wheels 32 and 33 on each of the crankshafts 13. The other end of the layshaft 25 has connected to it through a clutch 9, a sprocket-wheel 8 which is driven by a chain 7 from sprocket-wheels 6 on the other end of the two crankshafts 13. It will be appreciated that by means of the three chain drives and the two gear drives on the differential gearbox, six different speeds may be obtained.

Bolted to the two sides of the cylinder block and differential casing 14, are large hollow axle casings 34 and 35. The half-axles 21 extend through these casings and are connected by universal joints 36 to stub-axles 37 carried by bearings 38. The bearings are mounted in a housing 39 having two upright sleeves 40 extending on either side thereof, which sleeves slidably engage upright shafts 41 secured at their extremities to the axle casings 34, 35. Compression springs 42 encircle the sleeves and upright shafts and bear at their ends respectively on the axle casing and bearing housing. Instead of the axis of the shaft 41 being upright as shown in Figure 2, it may be inclined to a vertical plane 75, as shown in Figure 5, and the road wheel 71 may be so attached to the stub-axle 37 that its plane 72 is inclined to said vertical plane on the opposite side thereof to the axis 73, the arrangement being such that the axis 73 of the plane 72 intersects at or near the point of contact 74 of the wheel with the ground.

Secured to each stub-axle 37 in the usual manner is a brake-drum 43, while a closure-plate 44 is secured to the bearing housing 39. A flexible closure member 45 is secured between the closure-plate 44 and the end of the axle casing. Since the bearing housing is constrained to move in a straight path, while the half-axle 21 moves in an angular manner, a certain degree of longitudinal movement will require to be provided between the stub-shaft 37 and its universal joint 36, or between the universal joint 36 and the half-axle 21. This may be effected by providing a splined connection 70 between the stub shaft and that part of the universal joint to which it is connected, or between the half-axle 21 and the other part of the universal joint.

The two axle casings 34 and 35 may be secured directly to the chassis frame 46, for example, by bolts 47.

In the arrangement shown in Figures 3 and 4, there is shown a transmission suitable for a steerable road wheel 54. In this instance, the bearing housing 39 is provided with three arms 55, 56 and 57 (see Figure 4). The arm 55 is connected through a pivot connection 58 with a track rod 59 connected at its other end with a rectilinearly-moving rod 60 by a pivot connection 61. The rod 60 is moved by a transmission within a steering box 62 mounted on the engine unit. The springing system is mounted within the axle casing 34 but is of different type to that of Figures 1 and 2. Each of the arms 56 and 57 is connected through a ball-and-socket joint 63 with a lever-arm 64 having a hub portion 65 encircling an elongated boss 66 formed integral with or attached to the engine unit. The hub has also attached to it a cap member 67 having a splined bore which engages the splined end 68 of a torsion rod 69. The torsion rod may extend through a bearing in the engine unit, and is secured at both ends respectively to the arms 64 of the two steerable road wheels and is fixed against rotation at its centre in the engine casing. Instead of the axle casing being formed in two parts bolted one on either side of the cylinder block, a one-piece axle casing may be provided having a central compartment in which the engine unit is located. Also, in cases where a differential is not required the axle may be formed in one part having a crownwheel driven direct from the engine.

By the above means, a very light chassis and driving unit may be built up, which is particularly suitable for vehicles carried by aircraft.

This multiple unit is also particularly applicable to multiple driven axles for trains, railroad vehicles and for heavy commercial road vehicles and for military vehicles.

Also, the unit may be so constructed as to form a bogie for a rail vehicle.

The upper side of the internal combustion engine may be provided with a ventilating compartment in which engine auxiliaries such as the carburetor and ignition system may be disposed as described in applicant's copending application Serial No. 760,336, filed July 11, 1947.

I claim:

1. A driving unit for a motor vehicle comprising an internal combustion engine body, an axle casing fixed to the engine body and extending from each of the two opposite sides thereof, an axle extending through and projecting from each end of the casing and driven by the engine, a bearing around each axle, spring means entirely within and near each end of the axle casing between it and the bearing, and sealing means between the ends of the bearing and the ends of the casing for completely enclosing the spring means within said axle casing.

2. A driving unit for a motor vehicle comprising an internal combustion engine body, two axle casings fixed respectively to each side of the body, an axle extending through and projecting beyond each axle casing and driven by the engine through a differential gear, a bearing around each axle, spring means entirely within each axle casing between it and the bearing, and sealing means between the end of each casing and the bearing for completely enclosing the spring means within said axle casing.

3. A driving unit for a motor vehicle comprising an internal combustion engine body, an axle casing fixed to each side of the body, an axle extending through and projecting beyond each axle casing and disposed beneath the engine shaft, a bearing around each axle, means for driving said axles through a differential gear from the engine shaft, spring means entirely within each axle casing between it and the bearing, and sealing means between the end of each casing and the bearing for completely enclosing the spring means within said axle casing.

4. A driving unit for a motor vehicle comprising an internal combustion engine body, two axle casings fixed respectively to the opposite sides of the body, a differential gear beneath the engine shaft and driven therefrom, an axle extending through and projecting beyond each end of casing, a universal joint connecting an end of each axle to said differential gear, a bearing around each axle end, spring means entirely within each axle casing between it and the respective bearing, and sealing means between the end of each casing and bearing for completely enclosing the spring means within said axle casing.

5. A driving unit for a motor vehicle comprising an internal combustion engine body, two casings fixed respectively to opposite sides of the body, a differential gear arranged beneath the engine shaft and driven thereby, an axle extending through each axle casing, a universal joint connecting one end of each axle to the differential gear, an up-and-down slideway at the extremity of each axle casing, a bearing mounted on the said slideway, a stub shaft in said bearing and a telescopic coupling between each stub shaft and the associated axle, and spring means entirely within each axle casing between it and said bearings, and sealing means between each bearing and the axle casing for completely enclosing the spring means within said axle casing.

6. A driving unit for a motor vehicle comprising an internal combustion engine body, two casings fixed respectively to opposite sides of the body, a differential gear arranged beneath the engine shaft and driven thereby, an axle extending through each axle casing, a universal joint connecting one end of each axle to the differential gear, an up-and-down slideway at the extremity of each axle casing, a bearing mounted on the said slideway, a stub shaft in said bearing and a telescopic coupling between each stub shaft and the associated axle, and spring means entirely within each axle casing between it and said bearings, and sealing means between each bearing and the axle casing for completely enclosing the spring means within said axle casing, a road wheel on each stub shaft, said slideway being so inclined that the plane of the wheel and the line of sliding lie on opposite sides of a vertical plane so that they intersect at or near the point of contact of the wheel with the road.

7. A driving unit for a motor vehicle comprising an internal combustion engine body, an axle casing fixed to each side of the body, a differential gear located beneath the engine shaft and driven thereby, an axle extending through each casing, a universal joint connecting an end of each axle to the differential gear, a stub shaft at the outer end of each casing, a universal joint for connecting the stub shaft to the axle, a bearing carrying the stub shaft, a housing carrying said bearing, a lever arm carrying the housing and fixed to one end of a torsion rod, the other end of which torsional rod is fixed to the body, and sealing means between the housing and axle casing completely enclosing the torsion rod within said axle casing.

PHILIP CONRAD VINCENT.

REFERENCES CITED

The following references are of record in the file of this patent:

UNITED STATES PATENTS

| Number | Name | Date |
|---|---|---|
| 1,143,699 | Guthrie et al. | June 22, 1915 |
| 1,414,235 | Underwood | Apr. 25, 1922 |
| 1,614,819 | Bauer et al. | Jan. 18, 1927 |
| 1,741,550 | Wright | Dec. 31, 1929 |
| 1,765,986 | Mackenzie | June 24, 1930 |
| 2,004,215 | Peterson | June 11, 1935 |

FOREIGN PATENTS

| Number | Country | Date |
|---|---|---|
| 5,395 | Great Britain | Aug. 27, 1908 |
| 484,552 | Germany | Oct. 17, 1929 |